(12) United States Patent
Cirillo

(10) Patent No.: US 11,283,788 B2
(45) Date of Patent: Mar. 22, 2022

(54) METHOD AND SYSTEM FOR AN INTERNET OF THINGS PLATFORM

(71) Applicant: NEC Laboratories Europe GmbH, Heidelberg (DE)

(72) Inventor: Flavio Cirillo, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 350 days.

(21) Appl. No.: 16/384,989

(22) Filed: Apr. 16, 2019

(65) Prior Publication Data

US 2020/0137043 A1 Apr. 30, 2020

Related U.S. Application Data

(60) Provisional application No. 62/753,116, filed on Oct. 31, 2018.

(51) Int. Cl.
*H04L 29/06* (2006.01)
*H04L 67/562* (2022.01)

(52) U.S. Cl.
CPC ...... *H04L 63/0815* (2013.01); *H04L 63/0807* (2013.01); *H04L 63/10* (2013.01); *H04L 67/2809* (2013.01)

(58) Field of Classification Search
CPC . H04L 63/0815; H04L 63/0807; H04L 63/10; H04L 63/102; H04L 67/2809; H04W 12/06; H04W 12/08; H04W 4/38; H04W 4/70

See application file for complete search history.

(56) References Cited

U.S. PATENT DOCUMENTS

| | | | | |
|---|---|---|---|---|
| 9,600,571 | B2* | 3/2017 | Shaashua | H04L 67/12 |
| 9,866,637 | B2* | 1/2018 | Doraiswamy | H04L 67/1021 |
| 10,367,794 | B2* | 7/2019 | Sayers | H04L 9/0643 |
| 10,602,353 | B1* | 3/2020 | Berdy | H04L 9/3234 |
| 10,757,140 | B2* | 8/2020 | Klaedtke | H04L 63/20 |
| 2014/0244768 | A1* | 8/2014 | Shuman | H04W 4/70 |
| | | | | 709/206 |
| 2016/0315816 | A1* | 10/2016 | Fang | H04W 4/70 |
| 2017/0345019 | A1* | 11/2017 | Radocchia | H04W 12/10 |
| 2019/0026716 | A1* | 1/2019 | Anbukkarasu | G06Q 20/389 |
| 2019/0037361 | A1* | 1/2019 | Nakamura | H04W 4/70 |
| 2019/0052641 | A1* | 2/2019 | Byrne | H04L 63/101 |
| 2019/0068592 | A1* | 2/2019 | Mattela | H04L 63/0876 |
| 2019/0253243 | A1* | 8/2019 | Zimmerman | H04L 9/3247 |
| 2020/0059521 | A1* | 2/2020 | Sciancalepore | H04L 67/34 |
| 2020/0076896 | A1* | 3/2020 | Anumala | H04W 4/70 |

(Continued)

OTHER PUBLICATIONS

Karimibiuki, et al., "DynPolAC: Dynamic Policy-Based Access Control For IOT Systems," *Pacific Rim International Symposium on Dependable Computing 2018* (Dec. 2018).

*Primary Examiner* — Sarah Su
(74) *Attorney, Agent, or Firm* — Leydig, Voit & Mayer, Ltd.

(57) ABSTRACT

A method for performing privacy-preserving data federation in an internet-of-things (IoT) system includes: receiving a data message; determining whether the data message contains new information; based on determining that the data message contains the new information, determining one or more directives to trigger based on the data message; and generating a registration based on the one or more triggered directives.

16 Claims, 10 Drawing Sheets

(56) References Cited

U.S. PATENT DOCUMENTS

| | | | |
|---|---|---|---|
| 2020/0125048 A1* | 4/2020 | McKee | G06Q 10/20 |
| 2020/0177589 A1* | 6/2020 | Mangalvedkar | H04L 67/12 |
| 2020/0244741 A1* | 7/2020 | Di Girolamo | H04L 67/2814 |
| 2020/0294503 A1* | 9/2020 | Ryu | H04W 4/02 |
| 2020/0329368 A1* | 10/2020 | Sharma | H04W 60/00 |
| 2021/0035173 A1* | 2/2021 | Nandwana | H04W 4/70 |

\* cited by examiner

METHOD AND SYSTEM FOR AN INTERNET OF THINGS PLATFORM

CROSS-REFERENCE TO RELATED APPLICATION

Priority is claimed to U.S. Provisional Patent Application No. 62/753,116, filed on Oct. 31, 2018, the entire disclosure of which is hereby incorporated by reference herein.

FIELD

The present invention relates to a method and system for privacy-preserving IoT federation platforms.

BACKGROUND

In the past decade, the Internet-of-Things (IoT) concept has been adopted overwhelmingly in many of the fields where data is produced and processed (e.g., automotive, health care, smart cities, industry, etc.) resulting in a plethora of diverse IoT platforms (whether general or specific purpose) and IoT deployments.

For example, the IoT concept has been utilized in the healthcare industry where data is very sensitive, but also of the highest importance for saving lives. Presently, many medical applications rely on heterogeneous sensors, deployed for instance at home, for monitoring patients and promptly delivering hints, for timely alerts, or for having an offline data analysis discovering patterns, anomalies and alike. Deployed sensors dispatch their measurements to a gateway, which is delegated to handle security and expose data or send reports to remote platforms that might be related to diversified domains (e.g., cardiovascular, nephrology, nutrition, etc.) and controlled by diverse administrations. Big data analytics medical applications might need data input from different domains for computing accurate output. Moreover, the quality of data should be very high; and therefore, only allowed sensors/gateways should be permitted to push certain measurements.

Another common IoT use-case relates to Smart Cities. In Smart Cities, many sensors are deployed almost anywhere in the public space and managed by diverse parties. For instance, there might be bus tracking sensors (e.g., measuring speed, acceleration, and/or location) owned by public transportation companies, surveillance cameras controlled by homeland security, and crowdsourced data collected from a smartphone application. A smart service for citizens could include dynamically optimizing the public transportation services by scheduling bus arrival time and bus route based on current needs (e.g., serving crowds moving within the city), or enhancing the transportation capabilities by supplementing the basic schedule with extra bus/tram rides as needed. For this purpose, crowd detection mined from cameras at bus stops, crowd mobility patterns from smartphone applications, and fleet capacity utilization could be input for an online analysis. A third-party organization offering such service (for instance, a research lab or a start-up) might not be aware of who is holding and offering such data. Therefore, such third-party should be able to discover data availability autonomously. The quality of the offered services might improve if the data quality or quantity rises.

Smart Industry is another IoT use-case. Machinery production companies are building apparatuses packed with sensors that monitor life-cycle and operational behaviors. Normally, industrial plants utilize equipment built by different machinery companies that are specialized in distinct niches, offering their own data services. Some applications for optimizing the production or strengthening factory security (perhaps offered by third parties) are realizable only if data from all (or most of) the producers are shared. However, the machinery companies can be protective of their data, and want to keep the control on their information.

Substantial effort has been made in order to define standards and ontologies for enabling interoperability between platform and inter-domain interaction. These approaches include: centralizing platforms and data storage under the control of a single authority; a federation of platforms leaving the sovereignty to local IoT administrator; and a blending of these centralization and federation approaches. The federation approach is generally more desirable to agencies that are reluctant (or are by regulation not permitted) to release the ownership of data (e.g., smart home environments, public administration, and industrial plants). In fact, currently, disparate IoT platforms are already operating and locally managed with IoT applications built on top, resulting in isolated domain silos.

SUMMARY

An embodiment of the present invention provides a method for performing privacy-preserving data federation in an internet-of-things (IoT) system, which includes: receiving a data message; determining whether the data message contains new information; based on determining that the data message contains the new information, determining one or more directives to trigger based on the data message; and generating a registration based on the one or more triggered directives.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
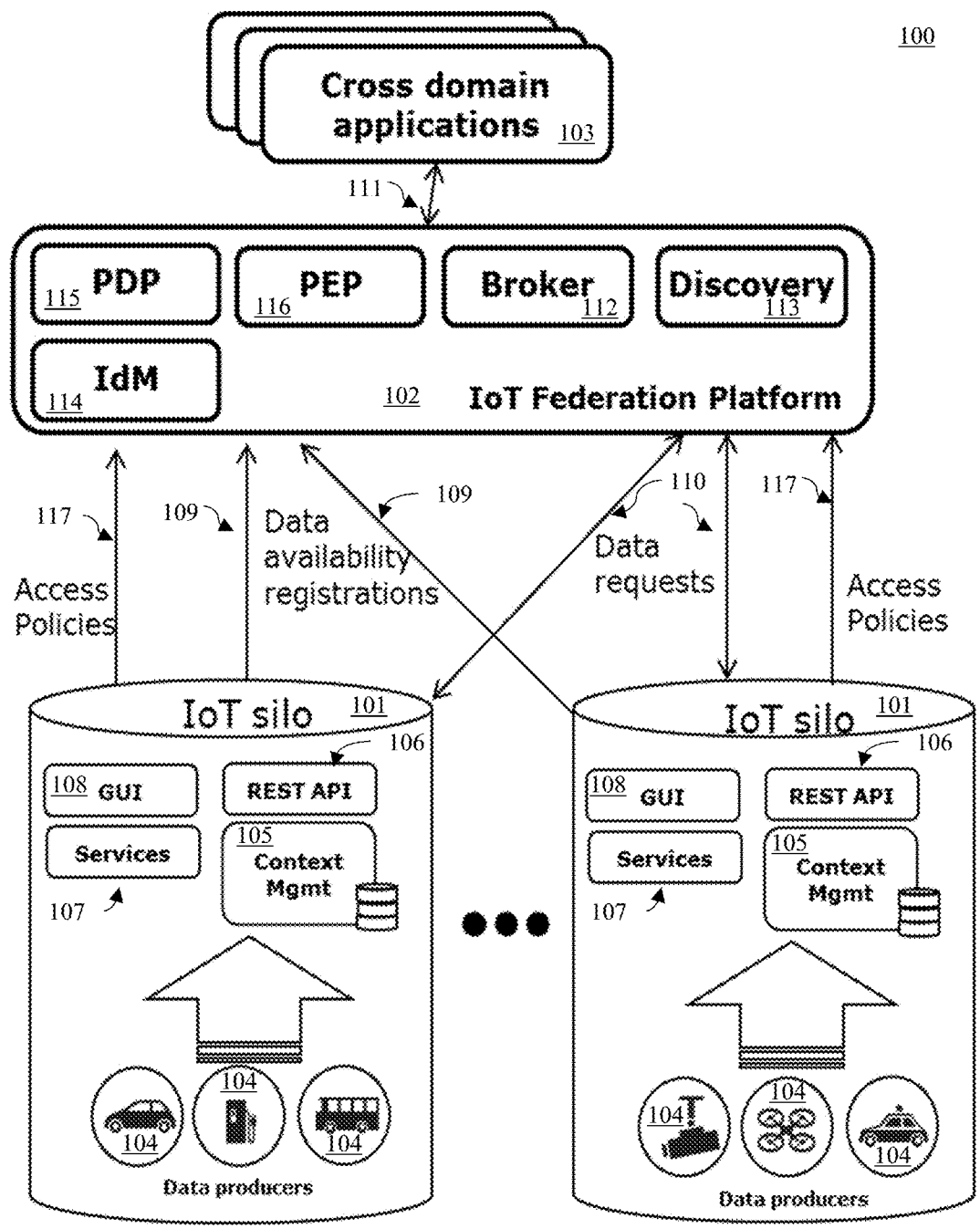
FIG. 1 illustrates a federation of IoT platform having a hierarchical approach.

The inventor has recognized from the examination of IoT use-cases (such as those previously described) several desirable characteristics for IoT systems. For instance, some desirable characteristics pertain to the way the data is exchanged, such as synchronous queries (which are done when the dataset is needed) and data streams (with asynchronous notifications), both of which are important for online analytics and the real-timeness is an important factor. In addition, data should be easily discoverable by data applications without the need of human intervention, especially in case dynamic changes happen in the data offering portfolio (e.g., a data marketplace). Furthermore, data is often highly confidential and regulated by restrictive laws (e.g. GDPR), which define where the information can be stored. Thus, in some cases, the sensors' records are locally stored closer to where those records are produced (e.g., in edge devices), or stored in a remote server fully controlled by administrative entity (e.g., hospitals). This raises the challenges associated with coping with diverse IoT platform architectures (e.g. cloud-based approach for energy constrained devices handling no sensitive data, or edge-based approach supported by gateways), and with multiple levels of federation. In addition, data is expected to be of enormous volume, even if keeping one entry registration for each sensor existence worldwide.

Security and privacy requirements are also gaining importance with regard to data usage and storage. As has been seen in IoT use-cases, data producers may be required to hold the ownership of the data (e.g., keep the data under their control and manage data access control). In addition, a correct authentication of a requester could avoid uncontrolled utilization of the platform, and by providing an authorization control, only selected actors may push data to avoid corruption of a dataset and/or data streams. In the case the data providers want to share their data, they need to declare the data availability within a registry. On the one hand, keeping too much generic registration (e.g., only the list of providers) in the registry would produce unnecessary requests to providers because they will be mostly contacted for data that is not available on their side. On the other hand, having an overly detailed description of the data (e.g., sensorId, exact sensor location, name of sensor maintainer, etc.) would disclose information that is just as sensitive as some of the associated measurements. Thus, an automatic privacy-preserving registration system is desirable. Finally, IoT communications can envisage encryption for avoiding eavesdropping attacks (e.g., use access tokens).

Embodiments of the present invention provide a method and system to enable (e.g., automatize) IoT platforms federation among IoT domains without disclosing sensitive information. Embodiments may include federation enablement messages that have data availability announcements and policies to regulate data access. These data availability announcements (also called registrations) and access policies are synthesized (generated) from data messages coming from the IoT data producers (e.g., sensors or devices) and/or from data availability declarations. The announcement generation follows directives specified by the owner (e.g., administration) of each federated IoT system.

Embodiments of the present invention provide at least the following advantages over the state of the art: (1) automatic check of privacy-preserving directives aimed to avoid disclosing information within the federation; (2) automatic generation of messages (as regulated by directives) used to enable federation among IoT platforms without the intervention of IoT administrators; and/or (3) automatic generation of access policies within the security layers in order to enable the data accessibility to the intended identities (as regulated by directives).

Embodiments of the present invention also enable IoT systems to minimize undesirable characteristics, such as: (1) latency of data source publication; (2) error in registrations and access policy creation; and/or (3) unnecessary requests to IoT providers.

Embodiments can also enable automating the processes for federating IoT platforms. For example, new data available in an IoT provider can be published to an IoT federation without the intervention of administrators, which allows for a plug-and-play approach. In addition, privacy-preserving directives can be applied in order to avoid disclosure of sensitive data. Moreover, data access policies can be automatically generated, accordingly to directives, in order to regulate authorization, data access and data usage control.

An embodiment of the present invention provides a method for performing privacy-preserving data availability registrations and data access policies rules specifications. The method includes: storing directives in an IoT registrar; and receiving or intercepting a data context or a data availability registration by the IoT registrar as received information. The method determines whether the received information contains: a yet unseen entity, or a yet unseen attribute of an already seen entity, or yet unseen metadata of the already seen entity, or a fresher metadata value of the already seen entity. Upon making that determination of unseen or fresher information, finding that a new registration is needed. When the new registration is needed, the method checks directives and forms a registration. If the registration is equal to one already done, then it is discarded; if the registration is different than, but related to, an already done registration, then the registration is updated; and if there are no registrations related to the registration, then a new registration is performed. If a new registration needs to be made or a former registration needs to be updated, one or more policies are synthesized according to directives. If the synthesized policies have been stored already in a Policy Information Point (PIP) then nothing happens, if one or more synthesized policies are new versions of policies already stored in the PIP, then those policies are updated, and if one or more synthesized are new policies, those policies are stored in the PIP.

An embodiment of the present invention provides a method for performing privacy-preserving data federation in an internet-of-things (IoT) system that includes: receiving a data message; determining whether the data message contains new information; based on determining that the data message contains the new information, determining one or more directives to trigger based on the data message; and generating a registration based on the one or more triggered directives.

The one or more triggered directives can be selected from a set of directives, each directive of the set of directives including corresponding registration generation functions. The generating the registration based on the one or more triggered directives can include: retrieving the registration generation functions of each of the one or more triggering directives, and executing the registration generation function on the data message to generate the registration.

In an embodiment, the method may further include determining whether the generated registration is a new registration or relates to, but does not match, an existing registration; and based on determining that the generated registration is the new registration or relates to, but does not match, the existing registration, outputting the generated registration.

In an embodiment, the method may further include generating an access policy based on the one or more triggered directives.

The one or more triggered directives can be selected from a set of directives, each directive of the set of directives having corresponding policy generation functions. The generating the access policy based on the one or more triggered directives can include: retrieving the policy generation functions of each of the one or more triggered directives, and executing the policy generation function on the data message to generate the access policy.

In an embodiment, the method may further include: determining whether the generated access policy is a new access policy or relates to, but does not match, an existing access policy; and based on determining that the generated access policy is the new access policy or relates to, but does not match, the existing access policy, outputting the generated access policy.

In an embodiment, the method may further include: determining whether the generated access policy matches an existing access policy; and based upon determining that the generated access policy matches an existing access policy, discarding the generated access policy.

In an embodiment, the method may further include: determining whether the generated registration matches an existing registration; and based upon determining that the generated registration matches the existing registration, discarding the generated registration.

The data message can be a data context message or a data availability message.

It can be determined that the data message contains the new information based on the data message identifying: a new entity in the IoT system, a new attribute of a known entity in the IoT system; new metadata of the known entity; or a new metadata value for the known entity.

The one or more triggered directives can be selected from a set of directives, each directive of the set of directives having corresponding conditions. The determining the one or more triggered directives can include: comparing the data message to the conditions for each directive of the set of directives; and determining a particular directive of the set of directives is a potential directive to trigger based on the data message matching the conditions of the particular directive.

Each directive of the set of directives can include a corresponding priority, and the determining the one or more triggered directives can include: determining that the particular directive is the one or more triggered directives based on the particular directive being the only one of the set of directives having the conditions that match the data message or based on the particular directive having a priority that is equal to or greater than other ones of the set of directives that have the conditions that match the data message.

One or more of the directives can be received from a system administrator. The directives can be stored in a storage.

Another embodiment of the present invention provides an internet-of-things (IoT) registrar having a processor coupled to a non-transitory storage memory containing instructions, which when executed by the processor, cause the IoT registrar to: receive a data message; determine whether the data message contains new information; based on determining that the data message contains the new information, determine one or more directives to trigger based on the data message; and generate a registration based on the one or more triggered directives.

Another embodiment of the present invention provides a non-transitory processor-readable storage medium storing instructions that upon execution cause an internet-of-things (IoT) registrar to: receive a data message; determine whether the data message contains new information; based on determining that the data message contains the new information, determine one or more directives to trigger based on the data message; and generate a registration based on the one or more triggered directives.

A hierarchical approach to federation between domains is depicted in FIG. 1.

The hierarchical IoT system 100 of FIG. 1 includes IoT silos 101 in communication with an IoT federation platform 102, which in-turn is in further communication with cross-domain applications 103.

An IoT silo 101 can define a domain of data generation and data usage (or be part of such domain). In the context of the present invention, "federation" is the mechanism by which data from one IoT silo 101 is shared with another IoT silo 101, with cross-domain applications 103, or with entities (such as users, IoT silos, or data producers) of another domain.

Each IoT silo 101 is composed of one or more data producers 104 that produce data for use in the IoT system 100. The data producers 104 may produce data asynchronously, periodically, or following an event (e.g., a wake up, or a change in the environment). An example of IoT producer is a sensor, which is capable of communicating its measurements in the IoT silo 101. However, a data producer 104 may also be considered the stack of a sensor and mediation gateway (e.g., if there is interoperability issues with the sensor alone). As another example, the data producers 104 may be compound devices installed in objects, such as private vehicles, public transportation vehicles, security cameras, police vehicles, etc.

The data producers 104 push their generated data to a context manager 105 (context management component) of the corresponding IoT silo 101. The context manager 105 may reside, for example, in local premises or into the cloud. The context manager 105 handles the data (e.g., by storing and indexing it) received from the data producers 104, and exposes the received data via APIs 106. The API may be a REST API, which uses Restful Web Services to expose the data via a web service. By using the REST API (or similar) the data may be given its own Uniform Resource Identifier (URI) on a network of the IoT silo 101, and allow for standard HTTP data sharing methods (e.g., GET, POST, PUT, SUBSCRIBE, QUERY, etc.). Services 107 and graphical user interfaces (GUI) 108 associated with each IoT silo 101 can then leverage the collected data via the API 106.

In order to let two or more IoT silos 101 inter-operate with each other (assuming that the communication between them is semantically homogeneous), the IoT silos 101 can declare their availability as IoT data providers to the IoT federation platform 102. For example, the IoT silos 101 may send data availability registration messages 109 to the IoT federation platform 102 in order to register the data being offered. When the IoT data providers are registered, data requests 110 from one IoT silo 101 arriving at the IoT federation platform 102 can be correctly and transparently dispatched from the IoT federation platform 102 to another one of the IoT silos 101.

Additionally, cross-domain applications 103 (i.e., applications that do not exist entirely within the domain of a particular IoT silo 101) can request and receive data 111 via the IoT federation platform 102, which can dispatch the data requests 110 to the correct IoT silo 101.

The federated IoT system 100 makes use of disparate components thereof and may conceptually divide the constituent components according to the roles performed, for example, into a context layer, a brokering layer, and a security layer.

The context layer generally concerns the components performing roles associated with generating data. The IoT producers 104 operate (at least in part) in the context layer. For example, one role (the simplest) that the IoT producers 104 perform in the context layer is producing data. The context manager 105 can also operate in the context layer, for example when performing the role of storing and indexing the data it receives and exposing the data to an interface through which the data can be retrieved. This interface, such as API 106, can offer means for query of (and/or subscription to) the data retrieved, and is also considered part of the context layer.

The brokering layer generally concerns mediating intra-domain data sharing. The IoT federation platform 102 has components (or performs functions) that fall within the brokering layer.

The IoT platform includes a broker 112, which is within the brokering layer. The broker 112 is a mediator that, given a data request 110, dispatches that request transparently to one or more IoT silos 101, depending on the parameters specified in the data request 110. The broker 112 also exposes an interface for executing a brokered query (e.g., a brokered query for data) and a brokered subscription (e.g., a brokered subscription to particular data updates) received from an IoT silo 101 and/or a cross domain application 103.

A broker 112 is assisted by a discoverer (discovery component) 113 that serves as a registry of available IoT silos 101. The discoverer 113 may also hold descriptions of the registered data. The discoverer 113 can be queried for matching data providers 104 and/or can handle subscription. Thus, notifying when a new matching provider 104 is registered (declared).

In an embodiment, every IoT silo 101 willing to participate in federation sends a data availability registration message 109 to the discoverer 113, which publishes (stores) the description of the provided (available) data.

The security layer generally concerns information security, including access and dissemination of information. The IoT federation platform 102 has components (or performs functions) that fall within the security layer.

The IoT federation platform 102 includes an identity manager (IdM) 114, which is part of the security layer. The identity manager (IdM) 114 holds and controls identities within the IoT system 100. For example, each component (e.g., IoT silo 101 and data producers 104) in the system 100 has a registered identity within the IdM 114. In an embodiment, the IdM 114 offers a token-based protocol, which allows components to identify securely each other.

The IoT federation platform 102 also includes a policy decision point (PDP) 115. The PDP 115 is a decision engine that responds to requests with a decision based on policies stored within a policy information point (PIP) and managed through a policy management point (PMP). For simplicity (but without limitation), when referring to PDP 115 herein, the PDP 115 also includes the PIP and PMP. A policy enforcement point (PEP) 116 intercepts communications and imposes the policies available in the system 100. For this purpose, the PEP 116 is assisted by the IdM 114 for authenticating requesters and is assisted by the PDP 115 for applying policies.

In an embodiment, each IoT silo 101 willing to participate in federation communicates an access policies message 117, which provides policies regulating access to the provided data.

Figure 2:
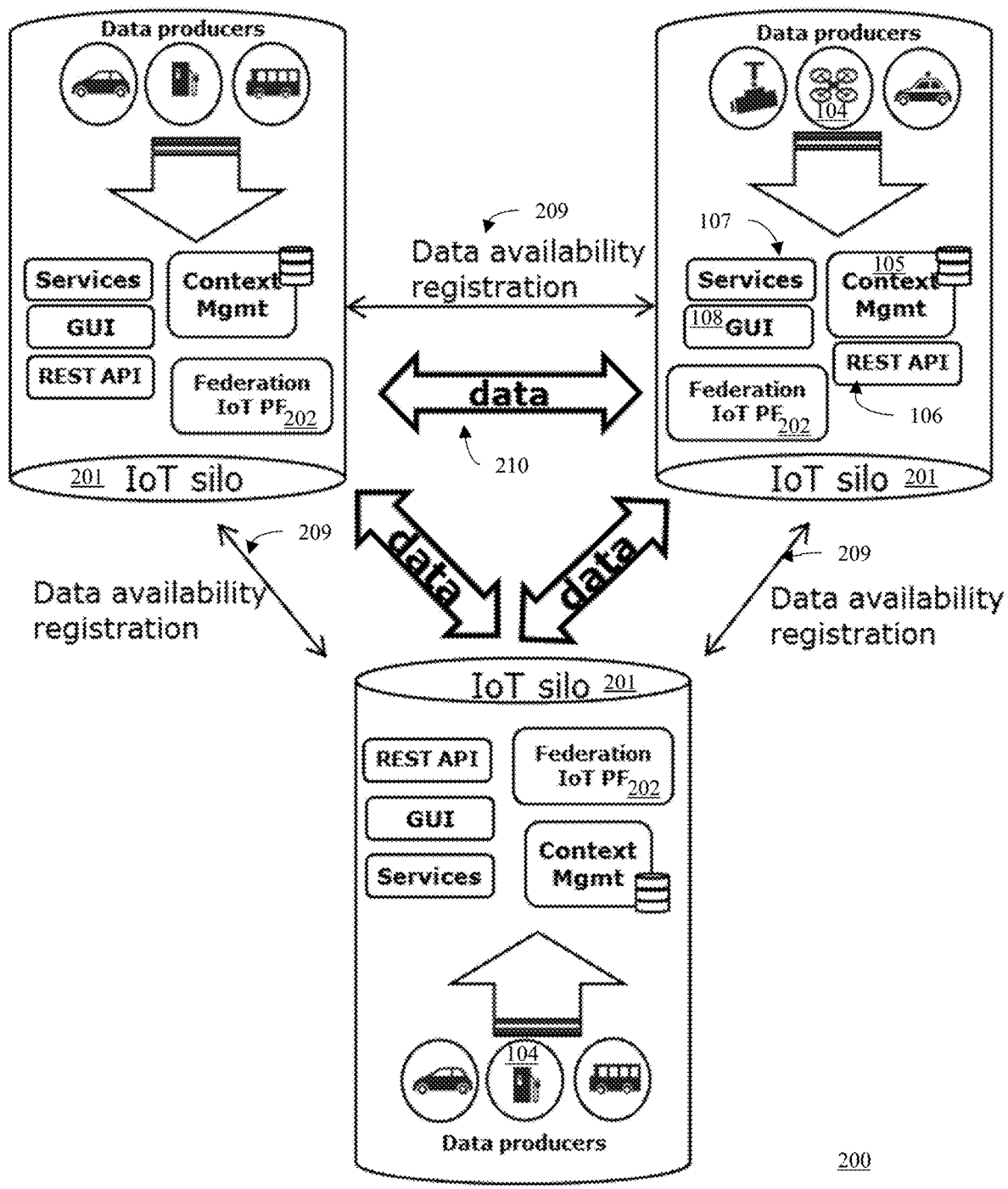
FIG. 2 illustrates a federation of IoT platform having a mesh-up approach.

FIG. 2 illustrates a mesh-up IoT system 200. The mesh-up IoT system 200 is similar to the hierarchical IoT system 100; however, with the significant difference that federation is handled by each of the IoT silos 201 in the mesh-up IoT system 200, instead of by a central IoT federation platform 102 as is done in the hierarchical IoT system 100.

In the embodiment shown in FIG. 2, each of the IoT silos 201 includes a federation IoT platform 202, which handles federation for each of the IoT silos 201. Apart, from the federation IoT platform 202, the IoT silos 201 operate essentially the same as the IoT silos 101 of the hierarchical IoT system 100. For example, each of the IoT silos includes data producers 104, a context manager 105, an API 106, services 107, and GUIs 108, which perform the same roles and operate in the same manner discussed above in connection with the embodiment illustrated in FIG. 1.

The IoT federation platform 202 also operates in essentially the same manner as its counterpart IoT federation platform 101 of the hierarchical IoT system 100. For example, the IoT federation platform also includes (performs the functions of) a broker, a discoverer, an IdM, a PDP, and a PEP.

Where the mesh-up IoT system 200 differs from the hierarchical IoT system 100, is that in the mesh-up IoT system 200, the IoT federation platforms 202 operate collectively to perform the functions that the central IoT federation platform 102 provided in the hierarchical IoT system 100.

For example, a data availability registration message 209 is sent to each of the IoT federation platforms 202 in each of the participating IoT silos 201, regardless of which IoT silo 201 the originating data producer 104 is associated with. In an embodiment, the inter-silo communication of the data availability registration message 209 is controlled by the IoT federation platform 202 of the participating IoT silos 201. In this way, registration of the available data providers (and/or data) to each of the discoverers 113 in the IoT federation platforms 202 of the participating IoT silos 201 is achieved.

Similarly, data messages 210 (e.g., data requests and responses) are shared IoT 201 silo to IoT silo 201, instead of via a central IoT federation platform. According to an embodiment, the inter-silo data messages 210 are handled by the IoT federation platforms of the participating IoT silos 201.

Also different from the hierarchical IoT system 100, in the mesh-up IoT system 200, the access policies are handled internal in IoT silo 201. As such, access policy messages (like access policy messages 117) are not disclosed external to the corresponding IoT silo 201.

As discussed above, in both of the federated IoT systems (100, 200), registration of the available data providers (and/or data) to the IoT federation platforms (102, 202)—e.g., in particular, to the discoverer 113—is performed in order to allow automatic brokering of messages (e.g., data requests, data sends, etc.). Such registration generally includes a description of the data producer (and/or data). System design concerns (such as security, privacy, efficiency, and capability) impact the decision on the amount and type of information included in such a description.

On the one hand, storing too generic of a description of the registration (e.g., only the list of data providers) in the registry (e.g., of a discoverer 113) could produce unnecessary requests to providers because they could be contacted for data that is not available on their side. On the other hand, storing a too detailed description of the data (e.g., sensorId, exact sensor location, or name of sensor maintainer) would disclose sensitive information to anyone, also to whom is not allowed to get the measured data. Accordingly, there is a tension between the usefulness of providing detailed registration information and the privacy and security concerns of providing such details.

While entering data availability registrations could be made the responsibility of human administrators, making the determination of providing the appropriate balance of a detailed, but still privacy-preserving, registration would require significant expertise for each deployment, would be considerably time and resource consuming, would be error prone, and also would induce latency on an effective usage of the sources. A plug-and-play approach (such as provided by the present invention) is therefore much more beneficial and advisable.

In addition, the IoT providers (e.g., the IoT silos and/or the data providers) are generally responsible for specifying access policies that are to be used by the IoT federation platform (e.g., that are used by the PDP for taking decisions that are applied by the PEP). Without these policies, a default policy is applied, which usually is very conservative (in order to avoid unsecured protection). As such, in the absence of a specified policy, the access to data is generally not allowed; thus, impeding federation. Also, the declaration of these access policies may be under responsibilities of the administrator.

Embodiments enable the IoT registrar to bring together aspects of the context layer, brokering layer, and security layer in a federated IoT systems by sending availability registrations and access policies to the IoT federation platform. The IoT registrar addresses drawbacks in federated IoT systems with regard to establishing appropriate access policies and providing the appropriate registration detail. This may be done on behalf of human administrators.

The IoT registrar subscribes for information and automatically synthesizes registrations (or updates old ones) when necessary. Thus, solving problems with human administrator-controlled registrations and access policies (among other things). In addition, the IoT registrar can allow the specification of directives for correctly transform information (e.g. by aggregation, obfuscation, filter) and preserving privacy. For example, the IoT registrar may be directed to register sensors only by their type (thus, if a second sensor for the same type appears, no changes are made to the registrations set) and by loose geographical area (for example, if the location is registered not with the (lat; long) pair but by the nearest municipality name). In addition, the IoT registrar can also dynamically populate the PDP with policies that otherwise would never allow the new data available to be accessed. Because they are dynamically populated, however, the policies can be changed to allow the new data to be accessed when appropriate.

Figure 3:
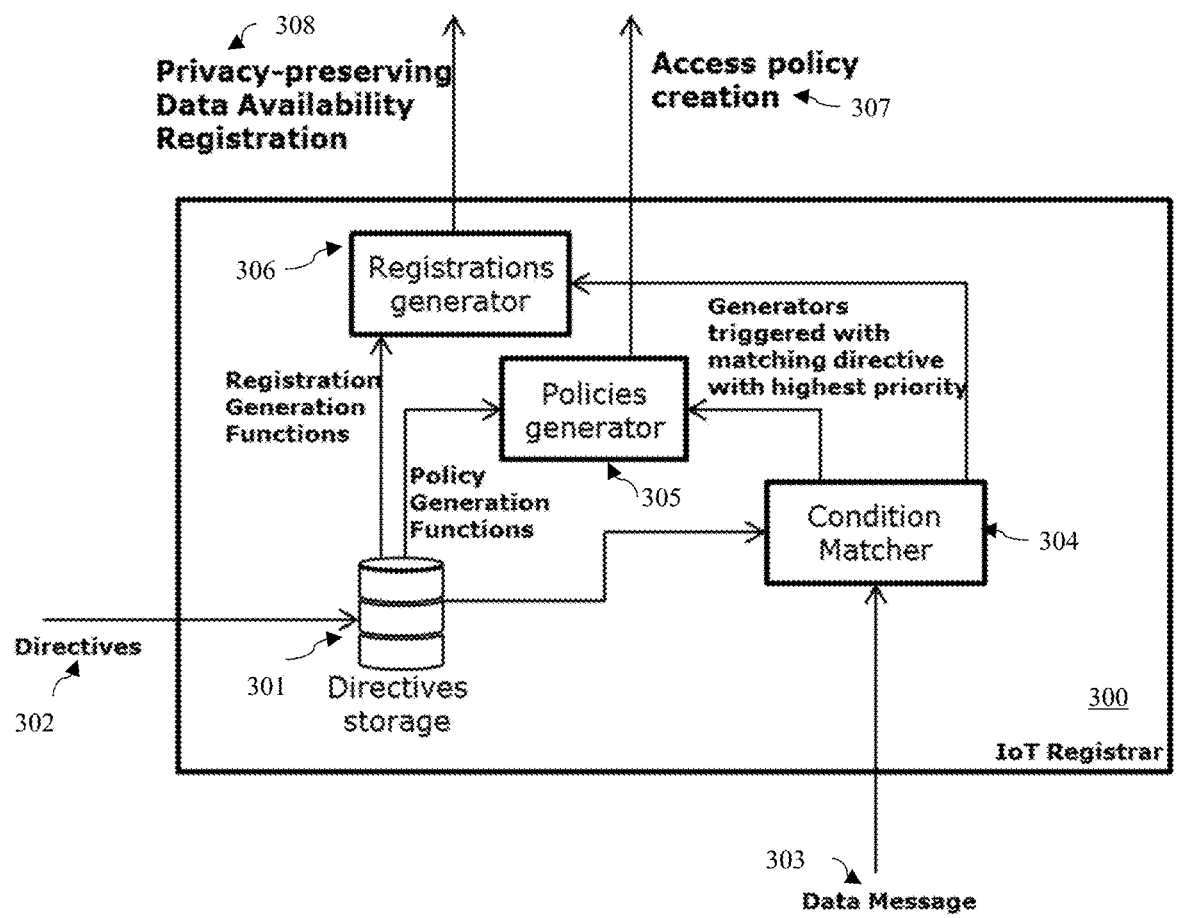
FIG. 3 illustrates an IoT registrar.

FIG. 3 illustrates the architecture an IoT registrar 300 according to an embodiment of the present invention. The architecture components may be implemented via software, in which case the depicted components represent particular aspects of the functionality of the IoT registrar 300. According to an embodiment, the IoT registrar 300 enables a mechanism for performing privacy-preserving data availability registrations and data access policies rules specifications in IoT systems.

The IoT registrar 300 includes a directives storage 301. The directives storage 301 stores and manages directives 302, which may be received from administrators (e.g., an IoT domain owner). The directives 302 may be received as part of setting up an IoT domain, an IoT producer, or any other time during the operation of the IoT system. Furthermore, directives 302 may be updated to replace prior directives 302.

According to embodiments, directives may have one or more of the following features: (1) a directive that instructs that the location of the entities, to which the information refers (e.g. a smart object such as a car), must be obfuscated (e.g., by substituting the exact location with the nearest city municipalities); (2) a directive that instructs that the entities identifier must be omitted; (3) a directive that instructs that the policies shall allow all to see a certain attribute (e.g. the speed of vehicles); (4) a directive that instructs that the exact metadata values (e.g. location of vehicles) are denied to all (only the one in the registration can be used as location); (5) a directive instructs that registrations coming from a defined source (e.g., by URI) needs to be registered as "OpenData" and/or (6) a directive instructs that registrations coming from a defined source (e.g., by URI) needs to be registered as "ConfidentialData". The above-listed directives are merely for illustration, and are thus, non-limiting examples of directives within the scope of the present invention.

According to an embodiment, a directive 302 is formed as follows: Directive=(Condition, Registration Generation Functions, Policy Generation Functions, Priority).

The Conditions define attributes of a data message that, when present, trigger the application of the corresponding Registration Generation Functions and/or the Policy Generation Functions of the Directive.

The Registration Generation Functions define a set of functions for generating data availability registrations. Each registration generation function can be specified, for example, as a mathematical function or code snippet, which when evaluated/executed causes an appropriate data availability message to be determined (and/or output). However, embodiments of the present invention are not so limited.

Similarly, Policy Generation Functions define a set of functions for generating the access policies. In order for a particular policy generation function to be applied, the associated Condition to be matched against the data message must be verified. Each policy generation function can be specified, for example, as a mathematical function or code snippet, which when evaluated/executed causes in an appropriate access policy message to be determined (and/or output). However, embodiments of the present invention are not so limited.

The Priority univocally identifies which Directive to apply if conditions from different Directives are matching for the same data message.

A more compact way of representing a Directive is:

$$\delta_i = (q, \Phi_{reg}, \Phi_{pol}, p)$$

Here, $\delta$ is the Directive; q is the Condition; $\Phi_{reg}$ is the Registration Generation Function; $\Phi_{pol}$ is the Policy Generation Functions; and p is the Priority.

The directives storage 301 of the IoT registrar 300 stores and manages the set of Directives, which can be represented as:

$$\mathcal{D} = \{\delta_1, \delta_2, \ldots \delta_n\}$$

Table I summarizes the inputs and outputs of the IoT registrar 300.

TABLE I

| | | |
|---|---|---|
| Input: | Data (d) | Piece of data arriving to the IoT Registrar |
| Input Directive | Condition: q | If data matches condition then registration and policy generation functions are applied. |
| | Registration Generation Functions: $\Phi_{reg}(x)$ | Set of functions for generating the registrations |
| | Policy Generation Functions: $\Phi_{pol}(x)$ | Set of functions for generating the policies |
| | Priority | Identifies the directive to be applied if more conditions from different directives are matching |
| Output: Registration | $O_r = \Phi_{reg}(d)$ | The registration is generated by applying the transformation functions to the data (i.e. "d") |
| Output: Policy | $O_p = \Phi_p(d)$ | The policy is generated by applying the transformation functions to the data (i.e. "d") |

By way of illustration (and without limitation), a Condition $q_i$ of a Directive $\delta_i$ may be defined as:

```
{
    "entities": [{
        "id": "temp.*",
        "isPattern": true
    },{
        "id": ".*",
        "isPattern":true,
        "type":"temperatureSensor"
    }]
}
```

The above example Condition is formatted as Open Mobile Alliance Next Generation Service Interface (OMA NGSI). In particular, it is an EntityIdList being an array of EntityId structure. An EntityId is a structure formed by: the entity identifier (i.e. "id"); a type of the entity (i.e. "type"); and a Boolean (i.e. "isPattern") indicating whether "id" is a string uniquely referring to an entity, or it is a pattern (i.e. a regular expression) referring to a set of entities. In the above example, there are two EntityId structures in the array: the first example is a regular expression that matches with all the data referred to entities with identifier starting with "temp"; the second example is a regular expression that matches all entities (".*" works as a wildcard) of type "temperatureSensor". Being these two EntityId structures in the same array put them in an "OR" logical relation.

Furthermore, Registration Generation Functions $\Phi_{regi}(d)$ of a Directive $\delta_i$ may be defined as:

(1)   $E' = \Phi_\varepsilon(d) = (f_{\varepsilon'1}(d), f_{\varepsilon'2}(d), \ldots, f_{\varepsilon'u}(d))$
      $f_{\varepsilon'1}(d) = $ function(d) {
          $\varepsilon' = \{$ id : ".*", type : c.entityId.type, isPattern:true$\}$
          return $\varepsilon'$
      }
(2)   $A' = \Phi_A(d) = (f_{\alpha'1}(d), f_{\alpha'2}(d), \ldots, f_{\alpha'p}(d))$
      $f_{\alpha'i}(d) = $ function(d) {
          for each attribute a in c.contextAttributeList
          A'.add({"name": "a.name", "type" : "a.type", "isDomain" : "false"})
          end of loop
          return A'
(3)   $\rho'=f_\rho(d)$
      $f_\rho(d) = $ function(d) {
          return externalAddress/iot
      }

Assuming that the data arriving contains context information (e.g. sensor measurements)—thus, data "d" is actually a context "c"—and assuming this is formatted as OMA NGSI, "c" includes: the EntityId structure (i.e., "c.entityId") univocally identified the entity of the context (e.g., a sensor, or the observed object); a list of attributes each including a name of the attribute (i.e., "a.name"), a type of the attribute (i.e., "a.type"), and a value (i.e., "a.contextValue").

A registration formatted in OMA NGSI includes: a list of EntityId structures; a list of ContextRegistrationAttribute structures, each including a name of the attribute (i.e., "name"), a type (i.e., "type"), and a Boolean (i.e., "isDomain") indicating whether the attribute registration refers to a specific attribute or to a class of attributes; a providing application which indicates the URL of the data provider.

Example (1) is a function to evaluate the EntityId of the registration (i.e., "ε'") given the context data (i.e., "c"). The function discards the actual name of the entity (e.g. car1) by obfuscating it with a generic wildcard (i.e., "id=.*" and "isPattern=true"). The type (e.g., vehicle) is instead kept in the registration. Thus a subsequent data context of a different entity (e.g., car2) of the same entity (e.g., vehicle) would result with the same "ε'".

Example (2) is a function to evaluate the set of ContextRegistrationAttribute structures. For every Attribute structures in the context "c" it creates a new ContextRegistrationAttribute structure where the name and type are unaltered from the ContextAttribute, whereas the "isDomain" is always set to "false".

Example (3) is a function that creates the providing URL of the registrations. It sets it constantly to "//externalAddress/iot/" which might be the exposed internet address of the context manager 105 (see FIG. 1) or the broker within the federation IoT platform 202 (see FIG. 2).

To illustrate an example, a piece of input data (d) arriving at the IoT registrar may take the form:

```
{
    "updateAction": "Append",
    "contextElements": [{
        "entityID": {
            "id" : "sensor1",
            "isPattern" : false,
            "type": "temperatureSensor"
        },
        "attributes" :[{
            "name": temperature,
            "type": "float",
            "contextValue": "25"
        }]
    }]
}
```

This piece of data is formatted as OMA NGSI UpdateContext. The data refers to an entity identified as sensor1 of type temperatureSensor. The "isPattern" specifies that the "id" is the proper identifier of the entity. The data includes data information regarding temperature, of type floating point of value 25. This data piece would match the second sub-condition of the example discussed above.

This piece of input data is contextual data. The data identifies the data provider by ID sensor1, and also identifies it as a temperature sensor. The data also indicates that the data provider is providing attribute data for a temperature that is recorded as 25.

Finally, applying the example Registration Generation Functions $\Phi_{r,egi}$ (d) to the data (d) arrives at the output registration $O_r$:

```
{
    "contextRegistrations" : [{
        "entities": [{
            "id": ".*",
            "type" : "temperaturesensor",
            "isPattern":" true"
        }],
        "attributes" :[
            {"name":"attribute",
            "isDomain":"false"
            }],
        "providingApplication" :"externalAddress/iot"
    }]
}
```

As a person of ordinary skill in the art would readily apprehend, the present invention enables great freedom in defining the particular conditions and functions to tailor to the registrations and policies as appropriate to the application.

Returning back to FIG. 3, when a data message 303 (e.g., a context data message, a registration data message, etc.) is sent to (or intercepted by) the IoT registrar 300, it is received by its condition matcher 304. The condition matcher 304 determines whether the data message 303 corresponds to one or more of the directives 302 stored in the directive storage 302. To make this determination, the condition matcher 304 checks whether the fields of the data message 303 match the conditions defined for any of the directives 302. If more than one directive 302 is found to correspond to the received data message 303, the directive with the highest priority is selected as the matching directive. The condition matcher 304 then triggers the policies generator 305 and the registrations generator 306 with the matching directive.

In the scenario where there the data message 303 matches multiple directives 302 all with the same highest priority, all of the matching directives 302 are passed to the policies generator 305 and the registrations generator 306. Nevertheless, embodiments of the present invention are not restricted to this behavior but different behaviors might be implemented.

In response to being triggered with the matching directive 302, the policies generator 305 and the registrations generator 306 retrieve from the directive storage 301 the policy generation functions and the registration generation functions, respectively, that correspond to the triggered directive 302.

The policies generator 305 then executes the retrieved policy generation functions to determine the access policy message 307. In an embodiment, the policy generation functions apply mathematical formulas or execute code on (at least part of) the received data message 303 to determine the access policy message 307. The access policy message 307 is then output by the IoT registrar 300.

The registrations generator 306, after retrieving the registration generation functions, executes the retrieved registration generation functions to determine the data availability registration message 308. In an embodiment, the registration generation functions apply mathematical formulas or execute code on (at least part of) the received data message 303 to determine the data availability registration message 308. The data availability registration message 308 is then output by the IoT registrar 300.

A basic algorithm executed by an embodiment of the IoT registrar 300 is shown below:

```
for each δ_i in 𝒟
    if data (d) matches q_i
        add δ_i to matchingDirectives
    end if
end of loop
take δ_k with highest priority from matchingDirectives
O_r = Φ_{k,reg} (d)
O_p = Φ_{k,pol} (d)
```

Figure 4:
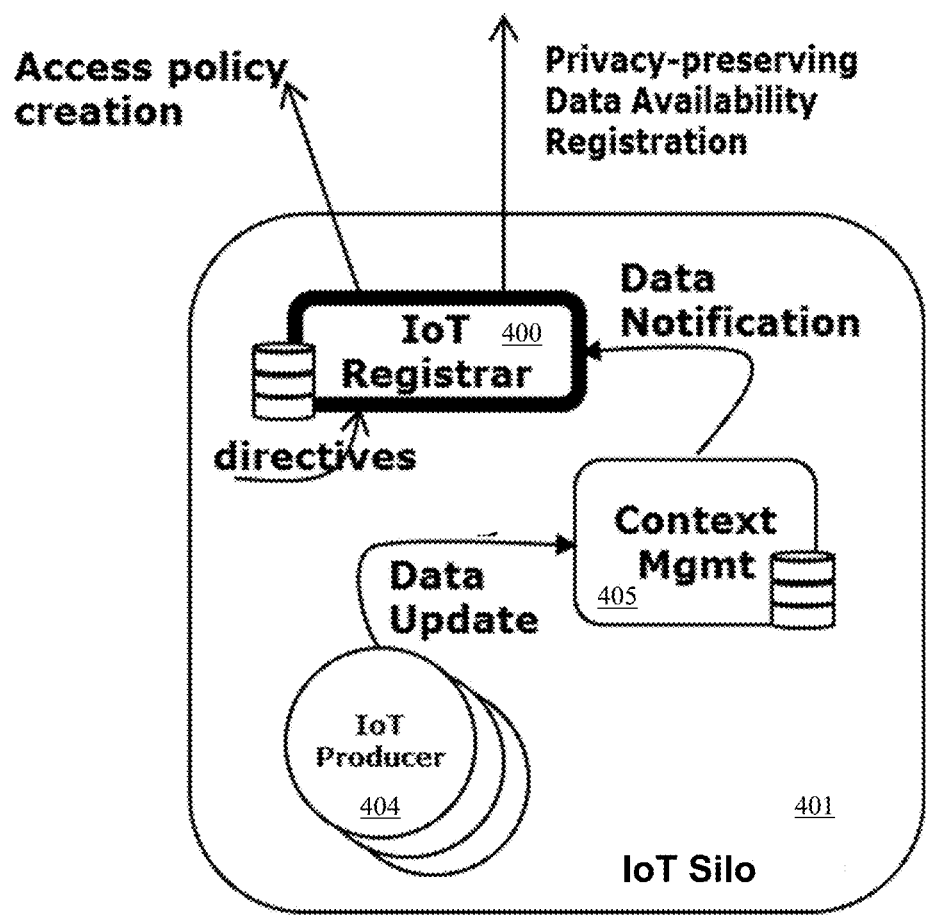
FIG. 4 illustrates an IoT registrar accepting IoT context update according to an embodiment.
Figure 5:
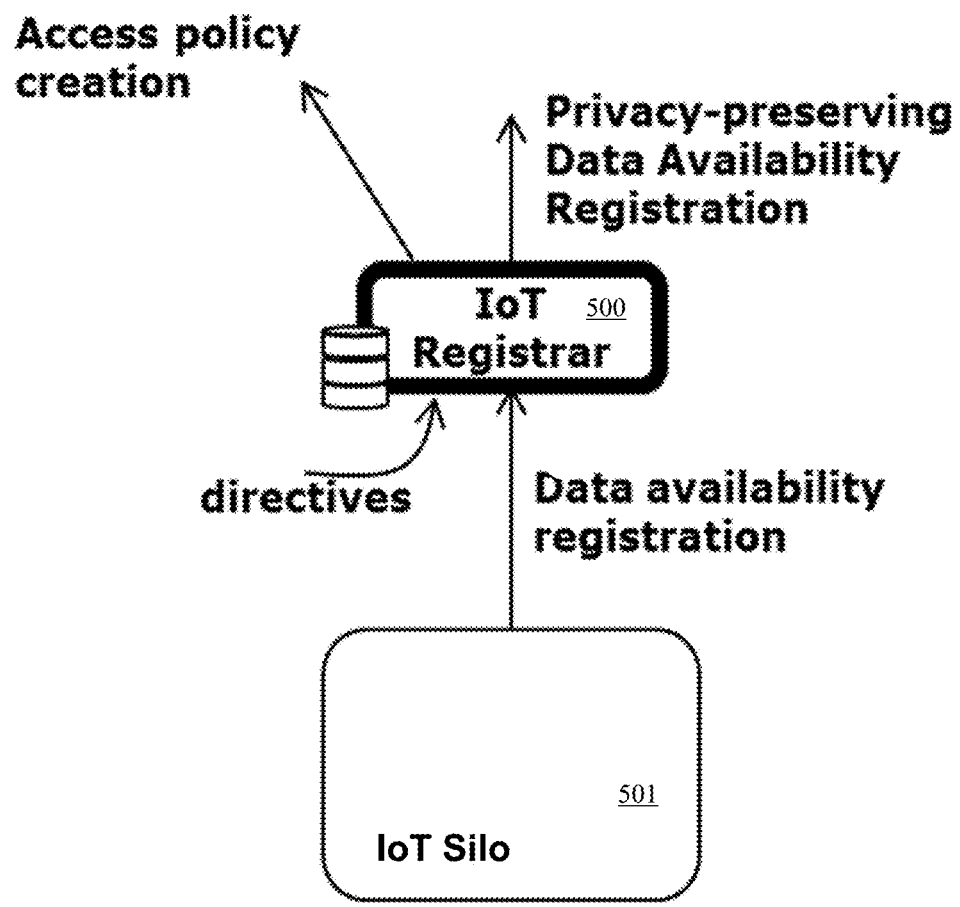
FIG. 5 illustrates an IoT registrar accepting IoT registrations according to an embodiment.

The IoT registrar may be located variously within an IoT system, depending on the system design. For example, an IoT registrar may be located as part of (or co-located with) a central IoT federation platform in a hierarchical IoT system. In another embodiment, an IoT registrar may be part of each IoT silo, including each IoT silo in a hierarchical IoT system or and each IoT silo in a mesh-up IoT system. For example, FIG. 4 illustrates an IoT registrar 400 included in an IoT silo 401, while FIG. 5 illustrates an IoT registrar 500 external to an IoT silo 501.

As mentioned above, the IoT registrar may receive (or intercept) various types of data messages. For example, the IoT registrar may receive context updates, registrations, etc.

Returning to FIG. 4, FIG. 4 illustrates an example of an IoT registrar 400 handling a context update. IoT producers 404 generate context data. For example, an IoT producer 404 may be a sensor that sends measurement data updates as its context data. In the example shown, the IoT producers 404 send their context data to a context manager 405. The context manager 405 sends the context data to the IoT registrar 400.

The IoT registrar 401 will determine whether a new registration (and or a new access policy) needs to be sent (and/or created) based on the received (e.g., pushed) context data. To make this determination, the IoT registrar 401 may check whether the received context data, for example: corresponds to a yet unseen entity (e.g., an previously unregistered IoT producer 404); contains a yet unseen attribute of an already seen entity (e.g., a new type of measurement, such as speed, from a previously registered IoT producer 404); contains yet unseen metadata of an already seen entity (e.g., location metadata is added for a previously registered IoT producer 404); or contains fresher metadata value of an already seen entity (e.g. new owner, new location for a previously registered IoT producer). As such, if the context data indicates that new information is available in the IoT system, then a new registration might be needed. If it is determined that a new registration is not needed, nothing further may be done by the IoT registrar 401.

This initial determination may be done by the condition matcher of the IoT registrar (such as the condition matcher 304 discussed above). This initial determination may be separate from the condition check to match to a directive or may be an integral part of the same condition check. For example, the Conditions defined in the Directives may include initial check conditions to determine if a Directive calls for a new registration generation. In another embodiment however, the initial check for whether a new registration might be needed is based on a global set of conditions that are used to perform a pre-check on the data message before checking to see if the attributes of the data message match a Directive. Regardless, the condition check performed by the condition matcher to determine whether a particular directive is matched can be the same as discussed above in connection with FIG. 3. Further, as described above, as a result of the condition check executed to determine a directive match, a registration is generated by a registration generator (such as the registration generator 306 discussed above) of the IoT registrar 400.

In an embodiment, if the generated registration relates to an existing registration (e.g., relates to data provider that has already been registered), but is different from the existing registration, then the registration is updated. If there are no existing registrations related to the generated registration, then a new registration is performed. If there is an existing registration that is related to and matches the generated registration, then no change is made.

If a new registration needs to be made or a former registration needs to be updated, one or more access policies are synthesized according to directives. In an embodiment, the access policies are generated by the policies generator (such as the policies generator 305 discussed above) of the IoT registrar 400 based on the triggering directive. If the generated policy matches an existing policy (or one that has already been stored in the PIP of a corresponding IoT federation platform) then nothing happens. If the generated policy is a new version of an existing policy, then the policy is updated (e.g., sent to the corresponding IoT federation platform and stored in its PIP). If the generated policy is a new policy, then the new policy is added to the IoT system (e.g., sent to the corresponding IoT federation platform and stored in its PIP).

Figure 6:
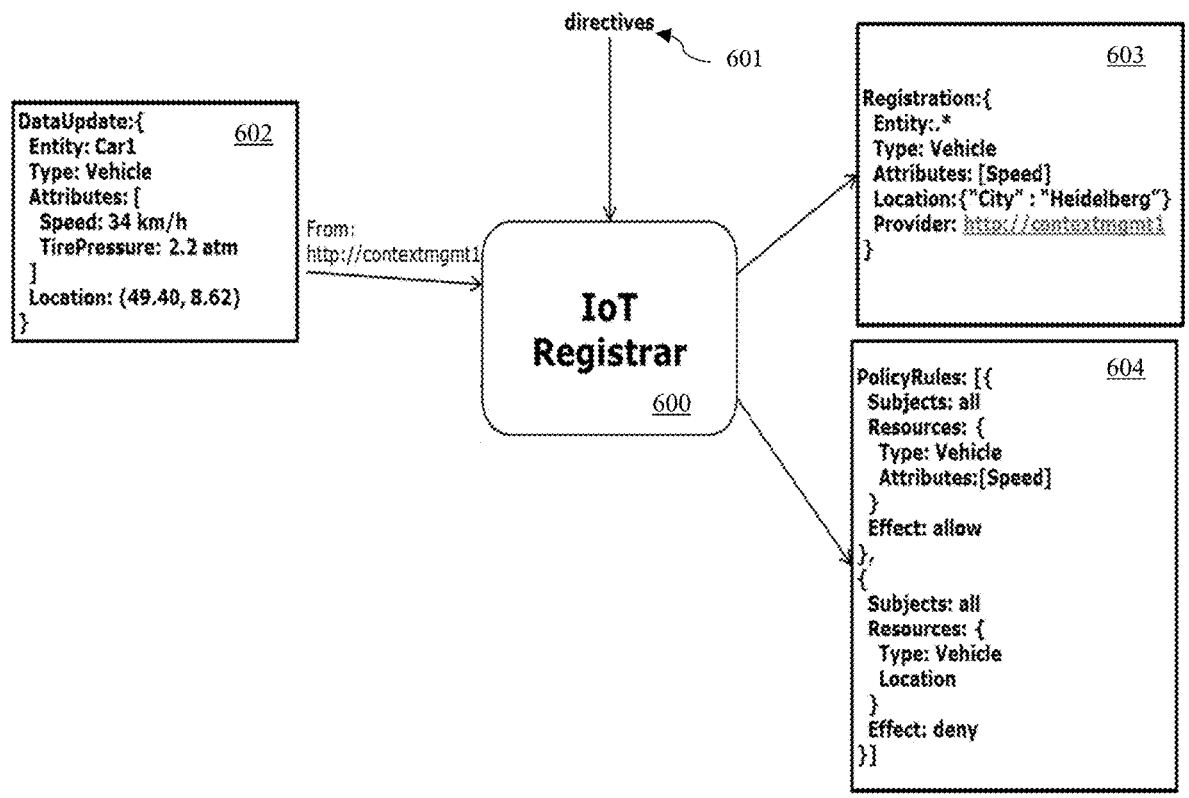
FIG. 6 illustrates a content based example of the operation of an IoT registrar of an embodiment.

FIG. 6 illustrates an example of an IoT registrar handling context based data messages. In FIG. 6, the IoT registrar 600 receives and stores one or more directives 601. The directives 601 may be added, updated, etc. during the operation of the IoT registrar within an IoT system.

The IoT registrar 600 receives a data message 602. In the example of FIG. 6, the data message 602 is a DataUpdate, which is a context data message. The data message 602 is received from the context manager with the ID contextmgmt1. This context manager may be part of a particular IoT silo, and may manage context data from a plurality of data providers (e.g., entities).

The data message 602 includes a variety of attributes, metadata, and values for the attributes and metadata. In particular, the data message 602 includes the metadata fields: Entity, Type, and Location. The data message 602 also includes the attribute fields: Speed, and TirePressure. The values associated with the metadata fields indicate that the Entity is Car1, the Type is Vehicle, and the Location is (49.40 lat, 8.62 lon.). The values associated with the attributes indicate the measurement data for Speed is 34 km/h and the measurement data for TirePressure is 2.2 atm.

The IoT registrar 600 examines the information contained in the data message 602 and determines whether a new registration might be required. For example, the registrar 600 may check whether: Car1 is a new Entity; Type and/or Location are new metadata fields; the Location value changed; or Speed and/or TirePressure are new attributes. If any one of these is new, the IoT registrar 600 determines that a new registration might be required. If new triggering information is not present (as defined by the system), no further action is taken by the registrar 600 on the data message 602.

Consider, for this example, that Car1 is a new Entity. In this case, the IoT registrar would then determine whether the data message 602 matches one or more directives 601, by comparing the data message 602 to the conditions. If a directive's conditions are met, then the registration generation functions and policy generation functions of that directive are triggered. In the example of FIG. 6, the data message 602 matches a directive 601.

Because a directive is triggered, its corresponding registration generation function is triggered. As described above, registration generation functions define how a data availability registration message is generated and sent (e.g., sent to an IoT federation platform). The data availability registration message can be used by participants in the IoT system to identify data available in the system. The registration generation functions defined by the directive control what information is provided about the available data (e.g., in consideration of privacy, security, efficiency, etc.).

In the example of FIG. 6, the data registration generation function is configured to obfuscate the Entity and Location metadata values and not report the TirePressure attribute. In particular, for the Location metadata, the data registration generation function is configured to obfuscate the location by indicating only the nearest city. As such, the generated registration message 603 produced by the IoT registrar 600 based on the received data message 602 is:

```
Registration: {
    Entity:.*
    Type: Vehicle
    Attributes:[Speed]
    Location: {"City" : "Heidelberg"}
    Provider: contextmgmt1
}
```

Similarly, the policy generation functions are triggered by the matched directive to generate an access policy message 604. Here, the policy generation function generates an access policy message that is sent to the IoT system (e.g., to the PIP of the IoT federation platform) that directs that all participants to the IoT system can access the Speed attribute for data providers of the Vehicle type, and that all participants to the IoT system are denied access to the Location metadata values for the data providers of the Vehicle type. As such, the generated access policy message 604 produced by the IoT registrar 600 based on the received data message 602 is:

```
Policy Rules: [{
    Subjects: all
    Resources: {
        Type: Vehicle
        Attributes: [Speed]
    }
    Effect: allow
},
{
    Subjects: all
    Resources: {
        Type: Vehicle
        Location
    }
    Effect: deny
}]
```

Returning to FIG. 5, FIG. 5 illustrates an example of an IoT registrar 500 intercepting a registration update. As discussed above, IoT silos generate data availability registrations; however, state of the art IoT silos may not generate privacy-preserving data availability registrations. Accordingly, an embodiment of the present invention provides an IoT registrar 500 that intercepts a data availability registration from an IoT silo 501, and generates a privacy preserving data availability registration and an access policy. The IoT registrar 500 may then send the privacy-preserving data availability registration and the access policy to one or more IoT federation platforms in the IoT System.

The IoT registrar 501 will determine whether a new registration (and or a new access policy) needs to be sent (and/or created) based on the received (e.g., intercepted discovered, or pushed) data availability registration. The registrar 501 is configured to determine under what conditions a new registration might be needed. For example, if the received data availability registration contains: a yet unseen entity; a yet unseen attribute of an already seen entity; a yet unseen metadata of an already seen entity; or a fresher metadata value for an already seen entity (e.g. new owner, new location), then a new registration might be needed.

If the IoT registrar 501 determines that a new registration might be needed, then the directives are checked. Directives, by non-limiting example, may have one or more of the following features: (1) instructions that, if a location is specified, the location of the entities must be obfuscated by substituting the exact location with the nearest city municipalities; (2) instructions that the entities name must be omitted; (3) instructions that registrations coming from a particular IoT provider (e.g., an IoT silo or data producer) needs to be registered as "ConfidentialData"; and/or (4) instructions that registrations coming from another IoT provider needs to be registered as "OpenData".

As such, if the received registration indicates that new information is available in the IoT system, then a new registration might be needed and the directives are checked to determine what the new registration message should contain. If it is determined that a new registration is not needed, nothing further may be done by the IoT registrar 501 in response to receiving the data availability registration (for example, it may pass on the data availability registration as-is).

This initial determination for whether a new registration may be needed can be done by the condition matcher of the IoT registrar (such as the condition matcher 304 discussed above). This initial determination can be separate from or part of the condition check that determines which Directive is triggered based on comparing the Conditions to the information of the received registration data message. Further, as described above, as a result of the condition check determining a directive match, a new registration is generated by a registration generator (such as the registration generator 306 discussed above) of the IoT registrar 500.

In an embodiment, if the generated registration relates to an existing registration (e.g., relates to data provider that has already been registered), but is different from the existing registration, then the registration is updated. If there are no existing registrations related to the generated registration, then a new registration is performed. If there is an existing registration that is related to and matches the generated registration, then no change is made.

If a new registration needs to be made or a former registration needs to be updated, one or more access policies are synthesized according to directives. In an embodiment, the access policies are generated by the policies generator (such as the policies generator 305 discussed above) of the IoT registrar 500 based on the triggering directive. If the generated policy matches an existing policy (or one that has already been stored in the PIP of a corresponding IoT federation platform) then nothing happens. If the generated policy is a new version of an existing policy, then the policy is updated (e.g., sent to the corresponding IoT federation platform and stored in its PIP). If the generated policy is a new policy, then the new policy is added to the IoT system (e.g., sent to the corresponding IoT federation platform and stored in its PIP).

Figure 7:
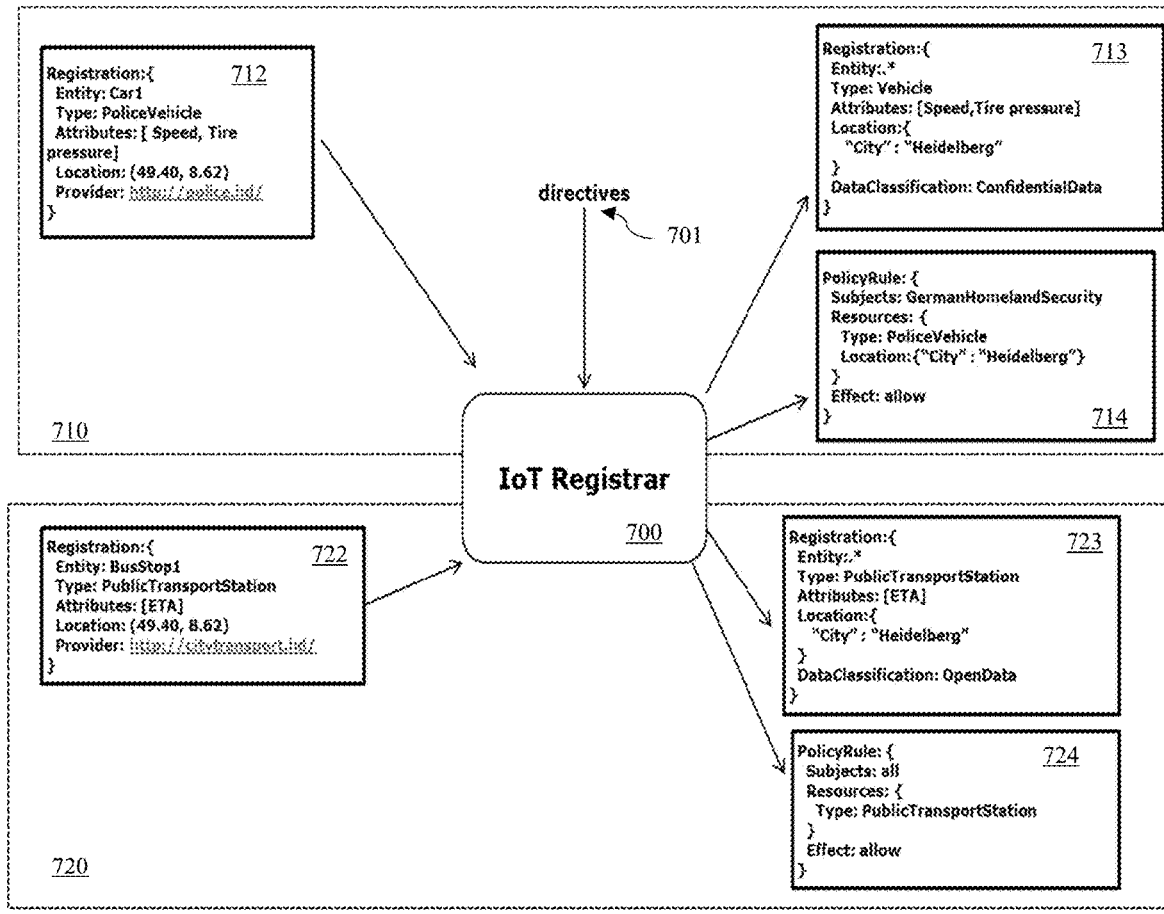
FIG. 7 illustrates a registration based example of the operation of an IoT registrar of an embodiment.

FIG. 7 illustrates an example of an IoT registrar handling data availability registration messages. In FIG. 7, the IoT registrar 700 receives and stores one or more directives 701. The directives 701 may be added, updated, etc. during the operation of the IoT registrar 700 within an IoT system.

The IoT registrar 700 receives a data message 712. In the example 710 of FIG. 7, the data message 712 is a Registration (e.g., a data availability registration message). The data message 712 declares as Provider the URL police.hd that is the one to be contacted for requesting the announced data. In the embodiment of FIG. 7, police.hd is the exposed address of the IoT silo from where the registration is coming (see FIG. 4). Also, as in FIG. 5, the IoT registrar 700 is outside the IoT silo. For example, the IoT registrar 700 may be part of a central IoT federation platform, in which case, the IoT registrar 700 may have receiving the data message 712 as part of the discovery process for the IoT silo police.hd participating in federation.

The data message 712 includes a variety of attributes, metadata, and values for the attributes and metadata. In particular, the data message 712 includes the metadata fields: Entity, Type, Location, and Provider. The data message 712 also includes the attribute fields: Speed, and Tire pressure. The values associated with the metadata fields indicate that the Entity is Car1, the Type is PoliceVehicle, and the Location is (49.40 lat, 8.62 lon.).

The IoT registrar 700 examines the information contained in the data message 712 and determines whether a new registration might be required. For example, the registrar 700 may check whether: Car1 is a new Entity; Type, Provider, and/or Location are new metadata fields; the Location value changed; or Speed and/or TirePressure are new attributes. If any one of these is new, the IoT registrar 700 determines that a new registration might be required. If new triggering information is not present (as defined by the system), no further action is taken by the IoT registrar 700 on the data message 712.

Consider, for this example, that Car1 is a new Entity. In this case, the IoT registrar 700 would then determine whether the data message 712 matches one or more directives 701, by comparing the data message 712 to the associated conditions. If a directive's conditions are met, then the registration generation functions and policy generation functions of that directive are triggered. In the example of FIG. 7, the data message 712 matches a directive 701.

Because a directive is triggered, its corresponding registration generation function is triggered. As described above, registration generation functions define how a data availability registration message is generated. The generated data availability registration can be used by participants in the IoT system to discover data available in the system. The registration generation functions defined by the directive control what information is disclosed regarding the available data (e.g., in consideration of privacy, security, efficiency, etc.).

In the example of FIG. 7, the triggered data registration generation function is configured to obfuscate the Entity, Provider, Type, and Location metadata values. In particular, for the Location metadata, the triggered data registration generation function is configured to obfuscate the location by indicating only the nearest city. As for the Type, the triggered data registration function is configured to report only that it is a Vehicle, not a PoliceVehicle. Furthermore, the triggered data registration function is configured to classify the data as confidential. As such, the generated registration message 713 produced by the IoT registrar 700 based on the received data message 712 is:

```
Registration: {
    Entity:.*
    Type: Vehicle
    Attributes:[Speed, Tire pressure]
    Location: {"City" : "Heidelberg"}
    }
DataClassification: ConfidentialData
}
```

Similarly, the policy generation functions are triggered by the matched directive to generate an access policy message 714. Here, the triggered policy generation function generates an access policy message 714 that only allows IoT participants that are members of GermanHomelandSecurity to access the data from the PoliceVehicle resource type. As such, the generate access policy message 714 produced by the IoT registrar 700 based on the received data message 712 is:

```
PolicyRule: {
    Subjects: GermanHomelandSecurity
    Resources: {
        Type: PoliceVehicle
        Location: {"City": "Heidelberg"}
    }
    Effect: allow
}
```

In the example 720 of FIG. 7, the IoT registrar 700 receives a second data message 722. The second data message 722 is also a Registration (e.g., a data availability registration message). The data message 722 is received from a Provider reference by the address citytransport.hd.

The data message 722 includes the metadata fields: Entity, Type, Location, and Provider. The data message 722 also includes one attribute field: ETA. The values associated with the metadata fields indicate that the Entity is BusStop1, the Type is PublicTransportationStation, and the Location is (49.40 lat, 8.62 lon.).

The IoT registrar 700 examines the information contained in the data message 722 and determines whether a new registration might be required. For example, the registrar 700 may check whether: BusStop1 is a new Entity; Type, Provider, and/or Location are new metadata fields; or ETA is a new attribute. If any one of these is new, the IoT registrar 700 determines that a new registration might be required. In FIG. 7, new triggering information is present.

Accordingly, the IoT registrar 700 then determines whether the data message 722 matches one or more directives 701, by comparing the data message 722 to the associated conditions. If a directive's conditions are met, then the registration generation functions and policy generation functions of that directive are triggered. In the example of FIG. 7, the data message 722 matches a directive 701.

Because a directive is triggered, its corresponding registration generation function is triggered. As described above, registration generation functions define how a data availability registration message is generated. In the example of FIG. 7, the data registration generation function triggered by the data message 722 is configured to obfuscate the Entity, Provider, and Location metadata values. In particular, for the Location metadata, the triggered data registration generation function is configured to obfuscate the location by indicating only the nearest city. Furthermore, the triggered data registration function is configured to classify the data as open. As such, the generated registration message 723 produced by the IoT registrar 700 based on the received data message 722 is:

```
Registration: {
    Entity:.*
    Type: PublicTransportationStation
    Attributes:[ETA]
    Location: {"City" : "Heidelberg"}
    }
DataClassification: OpenData
}
```

Similarly, the policy generation functions are triggered by the matched directive to generate an access policy message 724. Here, the triggered policy generation function generates an access policy message 724 that allows all IoT participants to access the data from the PublicTransportationStation. As such, the generated access policy message 724 produced by the IoT registrar 700 based on the received data message 722 is:

```
PolicyRule: {
    Subjects: all
    Resources: {
        Type: PublicTransportStation
    }
    Effect: allow
```

Figure 8:
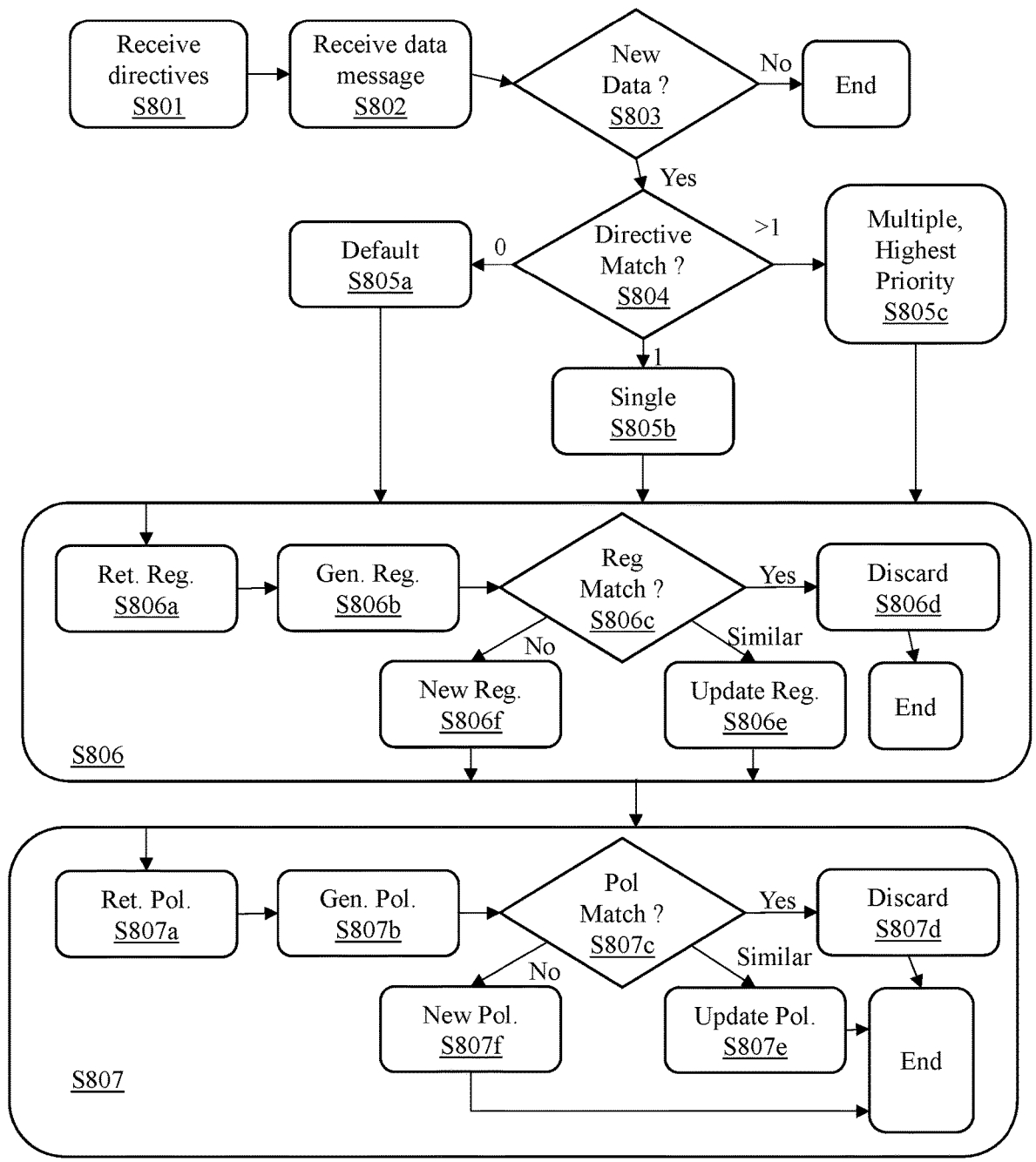
FIG. 8 illustrates a method for operating an IoT registrar according to an embodiment.

FIG. 8 illustrates a method according to an embodiment of the present invention. In an embodiment, the method may correspond to instructions stored in a computer readable medium that when executed by a processor cause the processor to operate as an IoT registrar of the present invention.

The IoT registrar is initialized by receiving and storing a set of directives (S801). As described above, each directive in the set of directives defines conditions, registration generation functions, policy generation functions, and a priority.

The IoT registrar subsequently receives (e.g., is pushed or intercepts) a data message (S802). The data message may be, for example, a data context message or a data availability registration message.

The IoT registrar then examines the received data message to determine whether new data is implicated by the data message (S803). For example, the IoT registrar determines whether the data message indicates: a yet unseen entity (e.g., data provider or IoT silo); a yet unseen attribute (e.g., a new type of measurement) of an already seen entity; yet unseen metadata (e.g., location is added as a metadata field) of an already seen entity; a fresher metadata value (e.g. new owner, new location) of an already seen entity. If new data is not implicated, then the IoT registrar does not act further on the received data message, and waits for the next data message to arrive. If however, new data is implicated, then a new registration might be needed, and the IoT registrar continues operating on the received data message.

After determining that a new registration might be needed, the IoT registrar determines whether the received data message matches a directive (S804). Here, the data message is compared against the conditions associated with each of the stored directives to determine which of the directives the data message matches.

If there are no matches, a default directive is triggered (S805a). If there is one match, that matched directive is triggered (S805b). If there are multiple matches, then the matched directive (or directives) with the highest priority is triggered (S805c).

Once the triggered directive is determined, the IoT registrar invokes a registration generation procedure (S806).

In the registration generation procedure (S806), the IoT registrar retrieves the registration generation functions associated with the triggered directive (S806a), and executes the registration generation functions to generate a new registration (S806b). The generated registration is then checked to determine whether or not it is the same as an existing registration (S806c). If the generated registration is equal to an existing one, then it is discarded (S806d). If the generated registration is different than, but related to, an existing registration, then the existing registration is updated (S806e). If there are no registrations related to the generated registration, then a new registration is performed with the generated registration (S806f).

If a new registration needs to be made or a former registration needs to be updated, one or more access policies are also synthesized according to the triggered directive (S807). Here, the IoT registrar retrieves the policy generation functions that are associated with the triggered directive (S807a), and then executes the policy generation functions to generate the access policy (S807b). The generated access policy is then checked to determine whether or not it is the same as an existing access policy of the IoT system (S807c). If the generated access policy has been already stored in the IoT system (e.g., the PIP of the IoT federation platform) then the generated access policy is discarded (S807d). If the generated policy is a new version of an existing policy (e.g., one already stored in the PIP), then the existing policy is updated (S807e). If the generated policy is a new policy, then the new policy is stored in the IoT system (e.g., in the PIP of the IoT federation platform).

The method may begin again at operation S802 when a new data message is received at the IoT registrar. Also operation S801 may be run occasionally as new/updated directives are received.

Accordingly, embodiments of the present invention generate data availability registrations and access policies in response to incoming data information (e.g., sensors observations, data availability announcements) by applying privacy-preserving directives. Embodiments of the present invention avoid disclosing sensitive data, but, at the same time, automatize the processes for federating IoT platforms.

Embodiments of the present invention also reduce latency of data sources accessibility by the timely generation of appropriate messages for data availability publication and access policies.

Embodiments of the present invention enable external applications to have a mechanism to more selectively choose IoT providers; and therefore, avoid using bandwidth for unfruitful query messages due to the systematic generation of precise data accessibility messages (such as registrations and policies) for each data message. Through the application of data transformation functions to the data messages, systems according to the present invention avoid errors on registrations and access policies that might compromise the privacy and the security of the data owned by an IoT domain.

The architecture of embodiments of the present invention can be scaled for achieving superdomains of domains iteratively. For example, each domain can be seen as a domain IoT provider by the superdomain infrastructure. The superdomain infrastructure manages a super-domain set of components such as: a super-domain federation PDP (sdPDP) and an IDM (sdIDM) synchronized with the domain federation PDP (dFedPDP) and IDM (dFedIDM); an intra-superdomain Discoverer (isdD) synchronized with the (domain) Federation Discoverers (dFedD); a super-domain IoT Registrar (sdIoTR) subscribed to the isdD; an intra-super-domain Broker (isdB) that references to the isdD; a super-domain Federated Discoverer (sdFedD) synchronized with Federated Discoverers of other super-domains; a super-domain federated PDP (sdFedPDP) and IdM (sdFedIdM) synchronized with other super-domains; and an outgoing and incoming super-domain federated Broker (outsdFedB and insdFedB).

Figure 9:
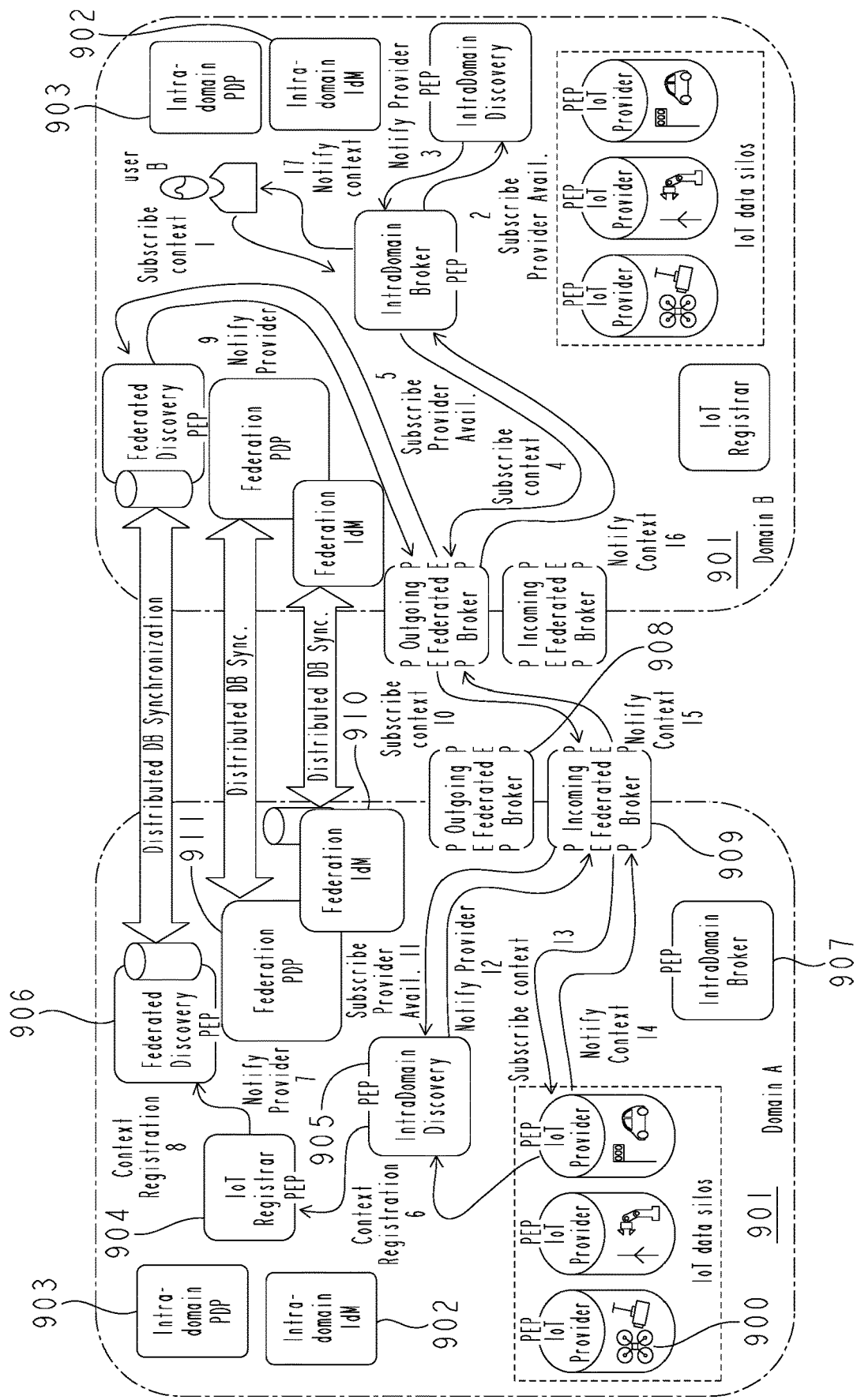
FIG. 9 illustrates a system for privacy preserving IoT registration.

FIG. 9 illustrates a multiparty secured exchange platform according to an embodiment of the present invention.

In the secured exchange platform illustrated in FIG. 9, each of the IoT provider silos 900 handle their own IoT deployment within their premises (or their cloud of choice) and expose their data through a context manager (such as discussed above in connection with FIGS. 1 and 2).

In each domain 901 (Domain A and Domain B) there are two security systems for two scopes of action: the intra-domain security system and the federation security system. The intra-domain security is formed by an IdM 902 (idIDM) and a PDP 903 (idPDP) in every domain 901 and various policy enforcement points (PEPs), one for each component to secure against users and/or components internal to each domain. For example, the IoT data silos 900, the IoT registrars 904, the intra-domain discoverers 905, and the intra-domain brokers 907 each have a PEP (as such, each of these components are secured components). Each domain's security systems are independent from each other.

When a message arrives to a secured component carrying an access token, its PEP first checks the authenticity of the sender, verifying with the assistance of the idIdM 902, and afterwards requests an access rights check to the idPDP 903. If any part of the verification does not succeed, a deny response is returned to the requester. Otherwise, the message is forwarded (transparently) to the secured component.

The federation security system is formed by a federation IdM (fedIdM) 910 and PDP (fedPDP) 911 for each domain 901, and by a PEP for each component exposed externally of the domains. For example, the federation discoverers 906, the outgoing federated broker 908, and the incoming federated broker 909 each has a PEP (as such, each of these components are secured components).

The fedIdMs 910 and fedPDPs 911 have synchronized databases, such that the same request done to any of a fedIdM 910 or fedPDP 911—even if in a different domain 901—should result in the same response. The synchronization between the databases might be achieved via distributed databases (e.g. Cassandra, Couchbase) or blockchain-based technology, as examples. Each of the domains 901 possess an identity that is used for authenticating and authorizing access to others' identities. The rules for accessing data between domains 901 are visible by all participants to the IoT system.

For intra-domain data exchange, the behaviors and message flows are similar to that discussed above in connection with FIGS. 1 and 2 (e.g., with the brokerage of an intra-domain Broker (idB) 907 assisted by an intra-domain Discoverer (idD) 905. In the case that the data requested by a user is available in a different domain, other components are used.

A federation discoverer (fedD) 906 is run within each domain 901 and their databases are synchronized similarly to fedPDPs 911 and fedIdMs 910. The registrations stored in the fedDs 906 are visible by anybody in the federation. Therefore, it is important to control which registrations are made.

Each domain 901 has an IoT registrar (IoTR) 904, which accepts context registrations and generates privacy preserving context registrations by following directives.

For brokering messages between domains 901, each of the domains 901 may deploy two instances of a broker: one for handling incoming request from outside the domain—an incoming federation Broker (inFedB) 909; and another to handle outgoing request to the other domains of the federation—an outgoing federation Broker (outFedB) 908.

The reason embodiments may have two federation brokers (908, 909) is to have them associated to two different discoverers (905, 906). In fact, when a request comes from inside the domain 901, the outFedB 908 sends an inquiry to the fedD 906 for discovering other domains 901 providing the data of interest. When a request comes from outside of the domain 901, the inFedB 909 discovers data providers within the domain using the idD 905. Therefore, all the registrations done by the IoT registrar 904 to the fedD 906 carry the exposed address of the inFedB 909 (or its exposed PEP address). Each of these boundary brokers (908, 909) may be protected by two different PEPs, one assisted by the intra-domain security system (idPDP 903 and idIdM 902) with the aim of regulating who in the domain 901 may do federated requests, and one assisted by the federation security system (fedPDP 911 and fedIdM 910) for moderating requests from known federation parties.

Embodiments having two layers of security enable domain administrators to decide, for a piece of data that might be exposed also externally, which part of the data can be communicated. For example, a request coming by the inFedB 909 might be treated differently by the PEP of an IoT provider 900 than a request coming from within the domain 901. For example, if an IoT provider 900 is exposing cars' information (such as, their location and speed), the IoT provider 900 might allow the local domain to see both the information, but it might want to show only the speed externally. Under this scenario, at registration time, the IoTR 904 would have a directive to obfuscate the cars' location by publishing only the name of the nearest city. However, a request to the IoT provider 900 might circumvent the privacy scheme. According, the PEP of the IoT provider 900 could filter out private information. Similarly, if Domain B 901 wishes to have different rules of data access from a Domain B user, the outFedB 908 in Domain B could receive the full piece of data, while the PEP of the idB 907 in Domain B can filter out data as prescribed in idPDP 903 of Domain B. This approach permits masking a user B's existence and its associated rules to be communicated externally.

At setup time, the IoTR 904 may make a subscription such that it receives every registration towards the idD 905. This will allow the IoTR 904 to synthesize, in a privacy preserving manner, all of the data provided by the IoT providers 900. The outFedB 908 can make a registration for everything to the idD 905 in order to be always contacted by the idB 907 when data is requested within its domain 901. The latter registration might be more selective if the corrected discovery of federation data is preserved. Table II illustrates settings for enabling the federated communication.

TABLE II

Domain infrastructure settings.

| | Access Control | Registration | Subscription | Discovery Binding |
|---|---|---|---|---|
| idB | Domain | None | None | IdD |
| idD | Domain | None | None | n/a |
| IoTR | Domain | None | Provider avail. to idD | n/a |
| outFedB | Domain for query and subscribe; fed for notify | Wildcard provider to idD | None | fedD |
| inFedB | Domain for notify; fed for query and subscribe | As provider for every registrations in fedD | None | idD |
| fedD | Domain | None | None | n/a |

FIG. 9 also illustrates an example scenario when a userB within Domain B 901 subscribes for data provided by an IoT provider 900 residing within Domain A 901.

UserB, sends a request (Step 1) to the PEP of the idB 907 of Domain B 901, the request including userB's access token. The PEP of idB 907 checks the user's identity, authorization and access control against the idPDP 903 of Domain B 901 and idIdM 902 of Domain B 901. If these checks are successful, then userB's request is passed to the idB 907 itself, which subscribes (Step 2)—using the Domain B idB 907 access token—for provider availability to the idD 905 of Domain B 901. The idD 905 stores only the generic registration of the outFedB 908 of Domain B, done at initialization setting (see Table II).

Consequently, the idD 905 asynchronously notifies (Step 3) the idB 907 of Domain B 901 (using the Domain B idD's access token). The idB 907 then forwards (Step 4) userB's subscription to the outFedB 908 of Domain B 901 (with the Domain B outFedB's token).

The outFedB 908 next subscribes (Step 5) for provider availability to the fedD 906 of Domain B (again passing through intra-domain security—PEP). Because none of the IoT providers 900 in any of the domains 901 has performed a registration yet, nothing happens.

When an IoT provider 900 in Domain A 901 performs a registration (Step 6) to the idD 905 in Domain A 901 (using the IoT provider access token), this registration gets notified to the IoTR 904 of Domain A 901 (with the Domain A idD's token) due to its initial subscription. The IoTR 904 then generates the registration according to the given privacy-preserving directives (e.g. specify only the type and the nearby city where the registration is geoscoped), and sends the generated registration to the fedD 906 of Domain A 901 (with the Domain A IoTR's access token), with a designation providing the externally exposed address of the inFedB 909 of Domain A (Step 8).

Because the distributed databases synchronize registrations, the generated registration is seen also by the fedD 906 of Domain B 901. The fedD 906 of Domain B 901 then notifies the outFedB 908 of Domain B (using the Domain B fedD's token) (Step 9). The outFedB 908 then performs a subscription (Step 10) to the inFedB 909 of Domain A using the federation identity and token of Domain B. The PEP of the inFedB 909 examines the federation identity and token for authorization using the fedIdM 910 of Domain A and fedPDP 911 of Domain A. If the federation identity and token are valid, then the inFedB 909 of Domain A 901 subscribes to the idD 905 of Domain A (using its domain-wise access token) (Step 11).

Because of the registration at Step 6, the idD 905 of Domain A 901 notifies (Step 12) the inFedB 909 of Domain A 901, which finally subscribes to the real owner of the data (Step 13).

The idD 905 of Domain A 901 also stores the generic initial registration of outFedB 908 of Domain A 901, which might create a loop between outFedB 908, fedD 906, inFedB 909, and idD 905 (all in Domain A 901). This loop can be broken either by an intelligent use of the PEPfed in front of outFedB 908 (no component within Domain A may pass through the PEPfed of outFedB) or through a loop detector system within the brokers (e.g. by tracing the hops).

When new data is generated, a notification (Step 14) is sent to the inFedB 909 in Domain A, which forwards the new data (Step 15), after a potential data access control filtering, to the outFedB 908 of Domain B 901 using the Domain A access token.

The outFedB 908 of Domain B 901 notifies the idB 907 of Domain B (using the Domain B outFedB token) (Step 16). Then the idB 907 of Domain B 901 notifies (Step 17) userB of the data it subscribed for in Step 1. At this point, the data flow channel is established, and for each new notification from the IoT provider 900, Steps 14-17 are repeated.

Figure 10:
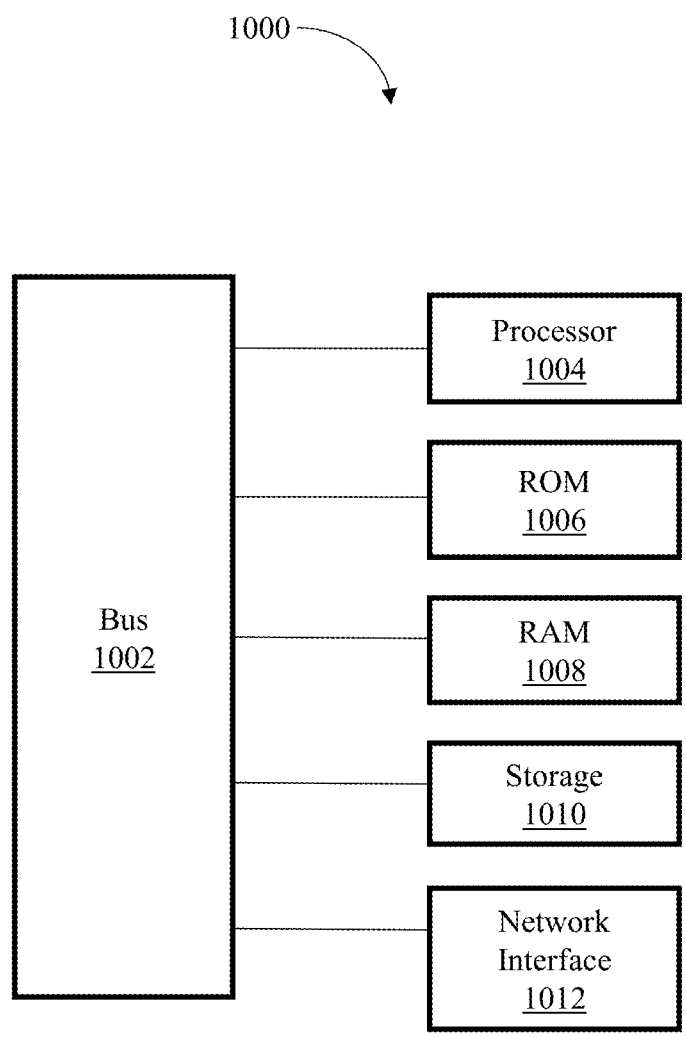
FIG. 10 illustrates a block diagram of an IoT processing system according to an embodiment of the present invention.

FIG. 10 is a block diagram of an IoT processing system according to an embodiment. The processing system 1000 is a specialized computer system that has been specifically programmed and configured to implement the systems, methods and/or modules described above. The processing system 1000 includes a bus 1002 and a processor 1004, such as a central processing unit (CPU) of a computing device or a distributed processor system. The processor 1004 executes processor executable instructions to invoke embodiments of the system for performing the functions and methods described above. In embodiments, the processor executable instructions are locally stored or remotely stored and accessed from a non-transitory computer readable medium, such as storage 1010, which may be a hard drive, cloud storage, flash drive, etc. Read Only Memory (ROM) 1006 includes processor executable instructions for initializing the processor 1004, while the random-access memory (RAM) 1008 is the main memory for loading and processing instructions executed by the processor 1004. The network interface 1012 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for performing privacy-preserving data federation in an internet-of-things (IoT) system, the method comprising:
   receiving a data message, wherein the data message is a data context message indicating context data produced by a device of the IoT system or a data availability message describing the context data produced by the device;
   determining whether the data message contains new information;
   based on determining that the data message contains the new information, determining one or more directives to trigger based on the data context message indicating the context data produced by the device or the data availability message describing the context data produced by the device; and
   generating a registration based on the one or more triggered directives, wherein the context data produced by the device indicates the device is previously known and indicates a new type of sensor measurement produced by the device or geographical location of the device, wherein generating the registration comprises generating a new registration for the device based on the new type of sensor measurement or geographical location, respectively.

2. The method of claim 1,
   wherein the one or more triggered directives are selected from a set of directives, each directive of the set of directives comprising corresponding registration generation functions, and
   wherein the generating the registration based on the one or more triggered directives comprises:
      retrieving the registration generation functions of each of the one or more triggered directives, and
      executing the registration generation function on the data message to generate the registration.

3. The method of claim 1, the method further comprising:
   determining whether the generated registration is a new registration or relates to, but does not match, an existing registration; and
   based on determining that the generated registration is the new registration or relates to, but does not match, the existing registration, outputting the generated registration.

4. The method of claim 3, the method further comprising generating an access policy based on the one or more triggered directives.

5. The method of claim 4,
wherein the one or more triggered directives are selected from a set of directives, each directive of the set of directives comprising corresponding policy generation functions, and
wherein the generating the access policy based on the one or more triggered directives comprises:
retrieving the policy generation functions of each of the one or more triggered directives, and
executing the policy generation function on the data message to generate the access policy.

6. The method of claim 4, the method further comprising:
determining whether the generated access policy is a new access policy or relates to, but does not match, an existing access policy; and
based on determining that the generated access policy is the new access policy or relates to, but does not match, the existing access policy, outputting the generated access policy.

7. The method of claim 4, the method further comprising:
determining whether the generated access policy matches an existing access policy; and
based upon determining that the generated access policy matches an existing access policy, discarding the generated access policy.

8. The method of claim 1, the method further comprising:
determining whether the generated registration matches an existing registration; and
based upon determining that the generated registration matches the existing registration, discarding the generated registration.

9. The method of claim 1, wherein determining that the data message comprises the new information is based on the context data comprising: a new entity in the IoT system, a new attribute of a known entity in the IoT system; new metadata of the known entity; or a new metadata value for the known entity.

10. The method of claim 1,
wherein the one or more triggered directives are selected from a set of directives, each directive of the set of directives comprising corresponding conditions, and
wherein the determining the one or more triggered directives comprises:
comparing the data message to the conditions for each directive of the set of directives; and
determining a particular directive of the set of directives is a potential directive to trigger based on the data message matching the conditions of the particular directive.

11. The method of claim 10,
wherein each directive of the set of directives comprises a corresponding priority, and
wherein the determining the one or more triggered directives comprises:
determining that the particular directive is the one or more triggered directives based on the particular directive being the only one of the set of directives having the conditions that match the data message or based on the particular directive having a priority that is equal to or greater than other ones of the set of directives that have the conditions that match the data message.

12. The method of claim 1, further comprising:
receiving the one or more directives from a system administrator.

13. The method of claim 1, further comprising:
receiving a second data message indicating a second context data produced by a second device of the IoT system, wherein the second device is a same type of device as the device associated with the data message; and
generating a new registration for the second device, wherein the new registration for the second device is different from the new registration of the device based on the new type of sensor measurement.

14. The method of claim 1, wherein generating the registration comprises obfuscating at least a portion of the context data.

15. An internet-of-things (IoT) registrar comprising a processor coupled to a non-transitory storage memory containing instructions, which when executed by the processor, cause the IoT registrar to:
receive a data message, wherein the data message is a data context message indicating context data produced by a device of the IoT system or a data availability message describing the context data produced by the device;
determine whether the data message contains new information;
based on determining that the data message contains the new information, determine one or more directives to trigger based on the data context message indicating the context data produced by the device or the data availability message describing the context data produced by the device; and
generate a registration based on the one or more triggered directives, wherein the context data produced by the device indicates the device is previously known and indicates a new type of sensor measurement produced by the device or geographical location of the device, wherein generating the registration comprises generating a new registration for the device based on the new type of sensor measurement or geographical location, respectively.

16. A non-transitory processor-readable storage medium storing instructions that upon execution cause an internet-of-things (IoT) registrar to:
receive a data message, wherein the data message is a data context message indicating context data produced by a device of the IoT system or a data availability message describing the context data produced by the device;
determine whether the data message contains new information;
based on determining that the data message contains the new information, determine one or more directives to trigger based on the data context message indicating the context data produced by the device or the data availability message describing the context data produced by the device; and
generate a registration based on the one or more triggered directives, wherein the context data produced by the device indicates the device is previously known and indicates a new type of sensor measurement produced by the device or geographical location of the device, wherein generating the registration comprises generating a new registration for the device based on the new type of sensor measurement or geographical location, respectively.

* * * * *